United States Patent Office 3,027,414
Patented Mar. 27, 1962

3,027,414
PROCESS FOR THE PRODUCTION OF ACETYLENE AND CHLORINATED HYDROCARBONS
Otto Fruhwirth, Burghausen-Obb., Germany, assignor to Wacker-Chemie GmbH, Munich, Germany
No Drawing. Filed Mar. 2, 1959, Ser. No. 796,227
Claims priority, application Germany Mar. 7, 1958
5 Claims. (Cl. 260—679)

The present invention relates to an improved process for the production of acetylene as well as other valuable products from aliphatic hydrocarbons and/or hydrogen containing halogenated aliphatic hydrocarbons.

A number of processes are known for the production of acetylene from aliphatic hydrocarbons.

In partial combustion processes a certain portion of the hydrocarbon to be cracked is burned with the aid of oxygen in order to supply the necessary heat for the cracking. The resulting cracked gas in addition to synthesis gas contains 8% of acetylene.

In thermal cracking processes the heat provided by the combustion of an additional fuel is employed to supply the heat required for the cracking either by direct or indirect heat exchange. The cracked gases produced contain 12–18% acetylene in addition to a mixture of saturated and unsaturated hydrocarbons and hydrogen.

Finally, in the electric discharge processes, the cracking energy is supplied by electric arcs or discharges. The gases produced contain 13% of acetylene in addition to methane and hydrogen.

These known processes for the production of acetylene require the supply of energy in order that the reactions can be carried out. In addition, considerable costs are entailed in the recovery of pure acetylene from the reaction products produced and in many instances the cracking process is only commercially feasible if the by-products can be fully utilized.

According to the invention it was found that acetylene containing gases could be produced, without requiring external supply of heat, which after absorption of the hydrogen chloride produced during the reaction contain a high concentration of acetylene in addition to other valuable products. In the process according to the invention aliphatic hydrocarbons, and/or hydrogen containing halogenated hydrocarbons are caused to react with chlorine at temperatures over 700° C. Preferably the chlorine and hydrocarbon and/or halogenated hydrocarbon mixture is introduced into the combustion chamber at a velocity of at least 10 meters per second.

In many instances it is of advantage to carry out the invention in several steps or in a cyclic process in order to maintain as low a carbon black formation as possible, as, for example, in the production of acetylene from methane. For example, a mixture of equal parts by volume of methane and chlorine can be reacted in the first step. The acetylene produced is removed from the reaction gas mixture with the aid of known absorbing agents and the remaining gas after addition of a further part by volume of chlorine is again reacted in the manner described. It is possible in this way to reintroduce the by-products, such as vinyl chloride, into the reaction and convert a portion thereof into acetylene.

Both saturated and unsaturated aliphatic hydrocarbons containing up to five and more carbon atoms, as well as the corresponding hydrogen containing halogenated hydrocarbons or mixtures thereof, can be employed as starting materials, without causing substantial influence upon the end-products obtained.

In general, especially when halogenated hydrocarbons are employed as starting materials, it is of advantage to preheat a portion of the starting materials or even better the entire mixture thereof to temperatures just below the reaction temperature in order to obtain as high yields of acetylene as possible. When such preheating of the reaction mixtures is employed it is a prerequisite that the velocity at which the preheated mixture is introduced into the combustion chamber is maintained greater than the speed of ignition of such mixture, which is usually greater than 50 meters per second.

It furthermore is advisable to select hydrocarbons or halogenated hydrocarbons as starting materials which in their molecules contain as low a quantity of hydrogen as possible in order to reduce the quantity of chlorine required and also to reduce the quantity of hydrogen produced to as low a quantity as possible. It is, for example, possible to use the ethylene rich cracked gases obtained in a thermal cracking process, expediently after extensive removal of the hydrogen contained therein.

In order to produce a maximum quantity of acetylene it is generally necessary to use a quantity of chlorine in excess of the theoretical quantity. However, in order to reduce the decomposition of acetylene produced, for example, to carbon black, it is advisable under circumstances to employ lower quantities of chlorine, preferably about theoretical quantities, even though the acetylene content of the reaction gases may be reduced thereby.

According to an advantageous embodiment of the process according to the invention, the chlorine and hydrocarbon and/or halogenated hydrocarbon mixture is burned in a flame maintaining a temperature between about 700 and 1200° C. (When measured by thermocouples within protective tubes.) The ignition of the reaction gas mixtures can be effected with an auxiliary flame, an electric arc, irradiation or surface active substances, such as active carbon. The course of the combustion within the flame can be regulated by the introduction of gaseous or liquid diluents and in that way easily prevent too great a rise in temperature which would cause undesirable decomposition of the acetylene produced. For this purpose, it is not only possible to employ inert substances, such as, for example, HCl, but also substances which take part in the reaction and under the reaction conditions either form acetylene, such as, for example, vinyl chloride, or liberate chlorine, such as, for example, carbon tetrachloride which liberates chlorine with the formation of perchloroethylene, or take up chlorine, such as, for example tetrachloroethylene, which takes up chlorine with the formation of perchloroethylene. When liquid diluents are employed it is not only possible to effect a cooling action at the beginning of the combustion by withdrawal of the heat required for the vaporization, but also with selection of substances having different boiling points to maintain such cooling action along the entire length of the flame and thereby prevent undesired temperature rises either in the core of the flame or in the flame tip.

The measures indicated above all repress the formation of carbon black caused by decomposition of the acetylene produced. When no special measures are taken during the chlorination reaction, up to about 20% of the acetylene produced may be lost through decomposition. However, with the special measures indicated, it is possible to reduce the formation of carbon black to about 5%. Furthermore, the use of subatmospheric pressures in the combustion as well as the immediate quenching of the reaction products after completion of the flame reaction and the subdivision of the total reaction flame into individual short flames also favor repression of acetylene decomposition with attendant carbon black formation.

The quenching or cooling of the reaction gases in the simplest case is effected by direct sprinkling or injection of water. In order to obtain pure HCl, the use of the adiabatic absorption method is recommended. It is also possible to cool the reaction gases indirectly in order to obtain the HCl in gaseous and dry form, but in this instance it is necessary to separate the acetylene and other by-products in a known manner, for example, by fractional condensation or with the aid of specific solvents.

The following examples will serve to illustrate the process according to the invention with reference to a number of specific embodiments thereof.

*Example 1*

1½ volumes of chlorine were mixed with 1 volume of methane, the mixture preheated to 300° C. and introduced at a velocity of at least 100 meters per second into an externally cooled combustion chamber and burned therein. The flame temperature ranged between 720 and 900° C. Water was sprayed into the reaction gases leaving the flame to effect immediate cooling thereof and absorption of the HCl contained therein. The resulting gas mixture was of the following composition:

55% acetylene
10% methyl chloride
8% vinyl chloride
27% methane

*Example 2*

A constant stream of ethylene of 10 cubic meters per hour was mixed with 12 cubic meters per hour of chlorine while maintaining a minimum velocity of 80 meters per second and the mixture introduced at a velocity of 100 meters per second into an externally cooled tube 6 meters long and having an internal diameter of 400 mm. and ignited. The temperatures of the resulting nearly colorless flame were 700° C. at its beginning, 950° C. in its core and 850° C. at its tip when measured by a thermocouple protected in a quartz tube. 110 kg./h. of water were sprayed into the center of the reaction tube directly after the termination of the flame to produce 146 kg./h. of concentrated HCl. The cooled reaction gases were then washed with water to remove the last traces of acid and then dried with lumps of NaOH. The resulting gas mixture was of the following composition:

70% acetylene
20% vinyl chloride
8% ethylene
2% various chlorinated hydrocarbons

*Example 3*

Equal volumes of ethylene, chlorine and HCl were mixed while maintaining a minimum velocity of 20 meters per second and the mixture introduced into an externally cooled combustion chamber at a velocity of 50 meters per second (to prevent backfiring) and ignited. The combustion gases were introduced into an absorber arranged immediately behind the combustion chamber and cooled therein to 40° C. The resulting gas mixture was of the following composition:

65% acetylene
25% vinyl chloride
10% of a mixture of 1,1- and 1,2-dichloroethylene

*Example 4*

A gas mixture consisting of—

50% ethylene
40% vinyl chloride
10% methyl chloride was mixed with about an equal quantity of chlorine and preheated to 500° C. The preheated mixture was introduced into a combustion chamber at a velocity of 100 meters per second and burned. After the HCl had been washed out of the combustion gases their composition was the following:

65% acetylene
20% vinyl chloride
5% methyl chloride
6% ethylene dichloride
Remainder various chlorinated hydrocarbons.

The vinyl chloride and methyl chloride were recovered from such gas mixture by fractional condensation and mixed with ethylene and chlorine and returned to the combustion.

*Example 5*

A cracked gas containing 50% ethylene, 25% propylene, 9% butylene, 12% methane, 3% ethane and 1% hydrogen was mixed with about an equal volume of chlorine and with 0.5 mol of tetrachloroethane per mol of chlorine and the mixture introduced into a combustion chamber at a velocity of 50 meters per second and burned therein. After removal of HCl the combustion gas was of the following composition:

36% acetylene
34% vinyl chloride
12% dichloroethylene
10% perchloroethylene and small quantities of higher boiling chlorinated hydrocarbons, such as hexachlorobutadiene

*Example 6*

7 cubic meters of methane, 22 cubic meters of chlorine and 10 kg. of carbon tetrachloride vapor were mixed per hour and heated to 500° C. and introduced through a nozzle grating containing 18 openings into a combustion chamber 500 mm. in diameter at a velocity of 80 meters per second and ignited. Directly after the termination of the flame wall, which was about 25 cm. thick, water was sprayed in to cool the combustion gases to 35° C. 5 kg./h. of perchloroethylene condensed with the concentrated hydrochloric acid produced. The remaining gas mixture was of the following composition:

60% $C_2H_2$
30% $CH_4$
6% $CH_3Cl$
4% $C_2H_2Cl_2$

*Example 7*

Equal parts by volume of ethyl chloride and chlorine were preheated to 500° C. and the heated mixture introduced through a nozzle at an outlet velocity of 50 meters per second into a combustion chamber and burned therein. After quenching the combustion gases by direct injection of water and washing out the last traces of acid with water, a crude acetylene product of the following composition was obtained 58% acetylene
16% vinyl chloride
12% ethylene
8% ethyl chloride
6% higher chlorinated hydrocarbons such as dichloroethylene

*Example 8*

A gas mixture of 80 vol. percent ethyl chloride and 20 vol. percent ethylene chloride was mixed with .9 its volume of chlorine and preheated to 600° C. The heated mixture was introduced through a nozzle at an outlet velocity of 70 meters per second into a combustion chamber and burned therein. The combustion gas after quenching with water and removal of the HCl produced was of the following composition:

55% acetylene
20% vinyl chloride
10% ethylene
8% ethyl chloride
7% higher chlorinated hydrocarbons

I claim:

1. A process for the production of acetylene and chlorinated hydrocarbons which comprises causing a mixture of at least one material selected from the group consisting of saturated aliphatic hydrocarbons, olefinic aliphatic hydrocarbons, saturated hydrogen containing halogenated aliphatic hydrocarbons and olefinic hydrogen containing halogenated aliphatic hydrocarbons with about the theoretical quantity of chlorine to burn in a flame at a temperature between 700 and 1200° C., the mixture being introduced into the combustion space at a velocity of at least 10 meters per second.

2. The process of claim 1 in which the mixture is preheated and is introduced into the combustion space at a velocity of at least 50 meters per second.

3. The process of claim 1 in which the acetylene produced in the reaction is removed from the reaction products and the remainder of the reaction products are recycled to the reaction.

4. The process of claim 1 in which said reaction is carried out at subatmospheric pressure.

5. The process of claim 1 in which the mixture to be reacted contains a diluent.

References Cited in the file of this patent
UNITED STATES PATENTS

| | | |
|---|---|---|
| 1,880,310 | Wulff | Oct. 4, 1932 |
| 2,167,927 | Groll et al. | Aug. 1, 1939 |
| 2,958,716 | Lahr et al. | Nov. 1, 1960 |

OTHER REFERENCES

Hessels et al.: J. Soc. Chem. Ind., pp. 323–6 (1939).